(12) United States Patent
Ringland

(10) Patent No.: US 11,895,018 B2
(45) Date of Patent: Feb. 6, 2024

(54) ROUTING OF BURSTY DATA FLOWS

(71) Applicant: BRITISH TELECOMMUNICATIONS PUBLIC LIMITED COMPANY, London (GB)

(72) Inventor: Simon Ringland, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 17/795,806

(22) PCT Filed: Jan. 27, 2021

(86) PCT No.: PCT/EP2021/051887
§ 371 (c)(1),
(2) Date: Jul. 27, 2022

(87) PCT Pub. No.: WO2021/151960
PCT Pub. Date: Aug. 5, 2021

(65) Prior Publication Data
US 2023/0066060 A1     Mar. 2, 2023

(30) Foreign Application Priority Data

Jan. 28, 2020 (EP) ..................................... 20154104
Jan. 28, 2020 (GB) ..................................... 2001173

(51) Int. Cl.
*H04L 45/00* (2022.01)
*H04L 47/10* (2022.01)

(52) U.S. Cl.
CPC .............. *H04L 45/38* (2013.01); *H04L 45/70* (2013.01); *H04L 47/10* (2013.01)

(58) Field of Classification Search
CPC .......... H04L 45/38; H04L 45/70; H04L 47/10
See application file for complete search history.

(56) References Cited

U.S. PATENT DOCUMENTS 6,532,212 B1    3/2003   Soloway et al.
6,816,903 B1 * 11/2004   Rakoshitz ............. H04L 41/509
                                                                             709/229

(Continued)

FOREIGN PATENT DOCUMENTS

WO      2004/056047      7/2004

OTHER PUBLICATIONS

International Search Report and Written Opinion of the ISA for PCT/EP2021/051887, dated Mar. 9, 2021 (15 pages).
International Preliminary Report on Patentability for PCT/EP2021/051887, dated Dec. 15, 2021 (17 pages).

(Continued)

*Primary Examiner* — Donald L Mills
(74) *Attorney, Agent, or Firm* — Nixon & Vanderhye P.C.

(57) ABSTRACT

An aspect of the present disclosure relates to a computer-implemented method for routing a bursty data flow comprising a series of one or more data packets over a converged network comprising a plurality of communication networks, the method comprising, for each of the series of data packets in turn: selecting which one of the plurality of communication networks to transmit that data packet over by: (i) obtaining flow statistics indicating a current flow state of the bursty data flow; and (ii) selecting the one of the plurality of communication networks in dependence on said flow statistics; then initiating transmission of the data packet over that one of the plurality of communication networks. Further aspects relate to a data processing system, a computer program, a computer-readable data carrier and a data carrier signal.

13 Claims, 11 Drawing Sheets

(56) References Cited

U.S. PATENT DOCUMENTS

| | | | |
|---|---|---|---|
| 9,661,530 | B2 | 5/2017 | Sharma et al. |
| 9,717,021 | B2 | 7/2017 | Hughes et al. |
| 10,193,781 | B2 | 1/2019 | Han et al. |
| 10,206,143 | B2 | 2/2019 | Altman |
| 2009/0010259 | A1 | 1/2009 | Sirotkin |
| 2010/0329118 | A1* | 12/2010 | Adams ............... H04L 47/762 370/235 |
| 2013/0132604 | A1 | 5/2013 | Cohen et al. |
| 2017/0155590 | A1 | 6/2017 | Dillon et al. |
| 2019/0200267 | A1 | 6/2019 | Meredith et al. |
| 2019/0312815 | A1 | 10/2019 | Altman et al. |
| 2022/0294727 | A1* | 9/2022 | Azzam ............... H04L 47/125 |

OTHER PUBLICATIONS

Combined Search and Examination Report for GB Application No. 2001173.0, dated Oct. 5, 2020 (10 pages).

Extended European Search Report for EP Application No. 20154104.2, dated Jun. 12, 2020 (11 pages).

Salleh, R. "Bandwidth optimization control protocol for 4G wireless mobile internet" Oct. 2007. ResearchGate. (7 pages).

Ford, A. et al. "TCP Extensions for Multipath Operation with Multiple Addresses" Jan. 2013. Internet Engineering Task Force (IETF) (64 pages).

"Differentiated services" Aug. 26, 2019. Wikipedia. (7 pages).

Amend. M. et al., "A Framework for Multiaccess Support for Unreliable Internet Traffic using Multipath DCCP" Jul. 10, 2019. IEEE LCN 2019. (8 pages).

Silver Peak Orchestrator Operator's Guide, 8.7 2019 200095-001, Jun. 2019, Silver Peak Systems, Inc., Santa Clara, CA (445 pages).

* cited by examiner

ROUTING OF BURSTY DATA FLOWS

This application is the U.S. national phase of International Application No. PCT/EP2021/051887 filed Jan. 27, 2021 which designated the U.S. and claims priority to EP 20154104.2 filed Jan. 28, 2020 and GB 2001173.0 filed Jan. 28, 2020, the entire contents of each of which are hereby incorporated by reference.

FIELD

The present disclosure relates to delivery of data flows over converged networks.

More specifically, an aspect relates to a computer-implemented method for routing a bursty data flow comprising a series of one or more data packets over a converged network comprising a plurality of communication networks. Further aspects relate to: a data processing system, such as a bonding gateway server, subscriber gateway device or user device, configured to perform such a method; a computer program comprising instructions which, when the program is executed by a computer, cause the computer to carry out such a method; a computer-readable data carrier having stored thereon such a computer program; and a data carrier signal carrying such a computer program.

BACKGROUND

As more devices become connected, in the sense of being capable of communication with other devices (e.g. via the Internet), network access is evolving to accommodate increasing demand. Connected devices are often now capable of communication with multiple access networks via multiple interfaces.

For example, in a system 100 schematically illustrated in FIG. 1, occupants of a premises 110 (which could be a home or business premises) can connect their devices to the Internet in various ways. An access point 120 provides converged network access via two links to wider networks. As a first example, a wired link L1 such as a Digital Subscriber Line (DSL) or optical fibre link runs from the access point 120 to a nearby street cabinet 130, which in turn connects to a fixed fibre optic communication network (not shown). As a second example, the access point 120 is within the coverage area of a cellular base station 140, which provides access to a wider cellular communication network (not shown) over a mobile link L2, such as a 5G connection.

The access point 120 in turn provides network access to devices within the premises 110 in various ways. As a first example, a wired link L3 such as an Ethernet cable is used to provide a fixed device such as a personal computer (PC) 150 with network access. As a second example, a wireless link L4 is used to provide a mobile device such as a smartphone 160 with network access, e.g. via Wi-Fi. The smartphone 160 has additional wireless connection capability via a mobile link L5, such as a 4G link, to the cellular base station 140.

Further communication links can be provided in addition to those illustrated. For example, the PC 150 could additionally have a Wi-Fi connection to the access point 120 and/or a Bluetooth™ connection to the smartphone 160. The smartphone 160 could additionally be configured for wired data transfer with the PC 150, for example using a Universal Serial Bus (USB) cable. The premises 110 could also be within the coverage area of a further cellular base station (for example operated by a different network operator to the illustrated base station 140) so that the smartphone 160's mobile link L5 can be provided via a different base station than the access point 120's mobile link L2.

FIG. 1 is merely an illustrative example to show how multiple communication networks of different types can converge to provide network access to various different devices. It can be seen that there are often multiple options available for any given data flow to be sent or received by a device. The concept of bonded or multipath communication links, in which such a data flow is split over multiple communication links, is developing to make efficient use of the increasing availability of converged networks.

The Multipath Transmission Control Protocol (TCP) specification ("TCP Extensions for Multipath Operation with Multiple Addresses", Internet Engineering Task Force (IETF) Request for Comments: 6824, ISSN: 2070-1721) for example defines a protocol for the delivery of TCP over multipath connections. It includes traffic distribution options such as: "maximise throughput", where two connections are aggregated; "overflow", where one connection is used as a primary connection and a secondary connection is only used if the demand exceeds the capacity of the primary connection; "failover" or "backup", where a primary connection is used exclusively unless if fails, in which case a secondary connection is used; and "low latency", where the latency is minimised.

FIGS. 2A and 2B illustrate how a bonded link can provide advantages with respect to a traditional communication link. In both figure the abscissa (t) indicates time and the ordinate (BR) bit rate.

In FIG. 2A a traditional communication link LA is used to communicate a bursty data flow, such as comprising video, audio, gaming or virtual reality (VR) data. (Any data flow consisting of a sequence of phases of high data transmission rate followed by low or zero data transmission rate can be characterised as "bursty"). FIG. 2A illustrates a typical bursty data flow transmission such as may be implemented by a video client. A few seconds of content is initially loaded into a content buffer as fast as possible prior to starting playback. This initial burst is of a duration D2A and uses the maximum capacity of the link LA, LA max. Playback then commences, with the client requesting blocks of video content at regular intervals. Like the initial content block, these blocks of content will typically be downloaded in bursts—as fast as possible by using the maximum link capacity LA max. This form of content demand results in a square wave pattern of traffic load as shown, which exhibits an initial burst followed by a regular burst+gap cycle. It can be seen that the bursty dataflow leaves very little link capacity for other data flows which may require concurrent communication over the link LA. In particular, the initial burst to load the buffer monopolises the link LA for a relatively long time D2A.

FIG. 2B illustrates how using a bonded link, comprising the link LA and an additional link LB, can improve this situation. In addition to the traffic bursts making use of the maximum capacity of the link LA, they use a secondary link LB as a top-up. This reduces the durations of the bursts, including the initial buffer load burst which has a duration of only D2B, which is shorter than D2A.

However, while use of a bonded link goes some way towards mitigating the link monopolisation problem described above, there are still periods during the traffic bursts (albeit shorter periods) when other data flows may not have sufficient link capacity available to them.

What is needed is an improved way of communicating bursty data flows over bonded communication links.

SUMMARY

According to a first aspect, there is provided a computer-implemented method for routing a bursty data flow comprising a series of one or more data packets over a converged network comprising a plurality of communication networks. The method comprises, for each of the series of data packets in turn:
  selecting which one of the plurality of communication networks to transmit that data packet over by:
    (i) obtaining flow statistics indicating a current flow state of the bursty data flow; and
    (ii) selecting the one of the plurality of communication networks in dependence on said flow statistics; then
  initiating transmission of the data packet over that one of the plurality of communication networks.

The method can further comprise, between steps (i) and (ii), performing a classification of the current flow state of the bursty data flow by selecting from a list of flow states in dependence on the flow statistics. Step (ii) can comprise selecting the one of the plurality of communication networks in accordance with a bursty bonding policy which mandates selection of the one of the plurality of communication networks in dependence on said classification.

The list can comprise a start-up phase and an established phase. The bursty bonding policy can be configured to result in transmission of the bursty data flow:
  over a first set of two or more of the plurality of networks while the current flow state is classified as start-up phase, and
  over a second set of the plurality of networks while the current flow state is classified as established phase, wherein the second set is smaller than the first set.

The flow statistics can comprise:
  a current flow duration, and
  an indication of whether or not a burst+gap cycle has started.

The step of performing the classification can comprise:
  classifying the bursty data flow as being in the start-up phase by determining that the current flow duration is below a threshold start-up flow duration and that the burst+gap cycle has not yet started; or
  classifying the bursty data flow as being in the established phase by determining that the current flow duration is below the threshold start-up flow duration and that the burst+gap cycle has started.

The flow statistics can further comprise:
  a current transmit fraction,
  a most recent classification, and
  a time since the classification last changed.

The list can further comprise a catchup phase and an overload phase.

The step of performing the classification can alternatively comprise:
  classifying the bursty data flow as being in the catchup phase by:
    determining that the current flow duration is equal to or greater than the threshold start-up flow duration and that the burst+gap cycle has not yet started; or
    determining that the most recent classification is established phase and that the current transmit fraction is higher than an upper catchup threshold transmit fraction; or
  classifying the bursty data flow as being in the overload phase by determining that the most recent classification is catchup phase and that the time since the classification last changed is higher than a threshold catchup duration; or
  classifying the bursty data flow as being in the established phase by:
    determining that the most recent classification is catchup phase and that the transmit fraction is lower than a lower catchup threshold transmit fraction; or
    determining that the most recent classification is overload phase and that the transmit fraction is lower than a lower overload threshold transmit fraction.

The bursty bonding policy can be configured to result in transmission of the bursty data flow:
  over a third set of the plurality of networks while the current flow state is classified as catchup phase; and
  according to a generic bonding policy while the current flow state is classified as overload phase.

The bursty bonding policy can be configured to result in transmission of the data flow over a plurality of the plurality of networks for no more than a threshold bonding interval.

The method can further comprise performing a precursor step in advance of all previously recited steps, said precursor step comprising one or more of:
  obtaining a flow type marker comprised in one or more of the data packets and classifying the data flow as bursty in dependence thereon;
  obtaining an indication of a source from which the data flow originated and classifying the data flow as bursty in dependence thereon; and
  obtaining an indication of a destination to which the data flow is addressed and classifying the data flow as bursty in dependence thereon.

The method can further comprise, for each of the series of data packets in turn, obtaining an indication of other traffic queued to traverse a node of the converged network that data packet will traverse during its transmission. Step (ii) can comprise selecting the one of the plurality of communication networks further in dependence on that indication.

For each of the series of data packets, the initiating step can comprise scheduling transmission of that data packet so as to throttle and/or shape the bursty data flow.

The method can further comprise, for each of the series of data packets in turn, obtaining an indication of other traffic queued to traverse a node of the converged network that data packet will traverse during its transmission. The scheduling step can be performed by applying the bursty bonding policy to that indication.

The scheduling step can be performed by applying the bursty bonding policy to the classification of the current flow state.

The flow statistics can comprise one or more of:
  a current duration of the bursty data flow;
  a bit rate of the bursty data flow;
  an indication of whether a burst+gap cycle of the bursty data flow has started;
  a cycle time of the bursty data flow as an average time between the start of consecutive transmission bursts;
  a current transmit fraction of the bursty data flow, defined as a running average of time spent in traffic burst as a fraction of current duration of the bursty data flow;
  a most recent classification of the current flow state; and
  a time since the classification of the current flow state last changed.

The bursty bonding policy can be configured to result in transmission of the data flow in one of the following modes:

overflow mode, wherein a preferred connection over one of the communication networks is preferentially used, connections over the other communication networks of the plurality only being used if demand exceeds the capacity of the preferred connection;

failover mode, wherein a mandated connection over one of the communication networks is exclusively used, connections over the other communication networks of the plurality only being used if the mandated connection fails;

load balance mode, wherein one of the communication networks is used for a predetermined fraction of traffic;

minimise latency mode, wherein traffic is distributed amongst connections over the plurality of communication networks in such a way as to minimise an objective function representing latency;

maximise peak rate mode, wherein traffic is distributed amongst connections over the plurality of communication networks in such a way as to maximise an objective function representing peak data rate:
  per communication network on an uplink of the respective communication network;
  per communication network on a downlink of the respective communication network;
  per communication network in aggregate on an uplink and a downlink of the respective communication network;
  in aggregate over the converged network on its uplink;
  in aggregate over the converged network on its downlink; or
  in aggregate over the converged network in aggregate on its uplink and its downlink;

maximise average rate mode, wherein traffic is distributed amongst connections over the plurality of communication networks in such a way as to optimise an objective function representing maximum average data rate:
  per communication network on an uplink of the respective communication network;
  per communication network on a downlink of the respective communication network;
  per communication network in aggregate on an uplink and a downlink of the respective communication network;
  in aggregate over the converged network on its uplink;
  in aggregate over the converged network on its downlink; or
  in aggregate over the converged network in aggregate on its uplink and its downlink; and fast start mode, wherein an initial portion of the data flow is transmitted in overflow mode and a subsequent portion of the data flow in failover mode.

The bursty bonding policy can be configured to result in transmission of the data flow within one or more throughput limits comprising limits on throughput:
  per communication network on an uplink of the respective communication network;
  per communication network on a downlink of the respective communication network;
  per communication network in aggregate on an uplink and a downlink of the respective communication network;
  in aggregate over the converged network on its uplink;
  in aggregate over the converged network on its downlink; and
  in aggregate over the converged network in aggregate on its uplink and its downlink.

The bursty data flow can comprise one or more blocks of consecutive data packets, each block comprising:
  only one of the series of data packets referred to above, and
  one or more further data packets.

The method can further comprise, for each of the blocks, initiating transmission of the one or more further data packets over the same one of the plurality of networks as the respective one of the series of data packets referred to above.

The plurality of communication networks can for example comprise two or more of:
  a cellular network;
  a fixed wire network; and/or
  a Wi-Fi network.

According to a second aspect, there is provided a data processing system, such as a bonding gateway server, subscriber gateway device or user device, configured to perform the method of the first aspect.

According to a third aspect, there is provided a computer program comprising instructions which, when the program is executed by a computer, cause the computer to carry out the method of the first aspect.

According to a fourth aspect, there is provided a computer-readable data carrier having stored thereon the computer program of the third aspect.

According to a fifth aspect, there is provided a data carrier signal carrying the computer program of the third aspect.

BRIEF DESCRIPTION OF THE FIGURES

Aspects of the present disclosure will now be described by way of example with reference to the accompanying figures. In the figures.

DETAILED DESCRIPTION OF THE FIGURES

The following description is presented to enable any person skilled in the art to make and use the system and is provided in the context of a particular application. Various modifications to the disclosed embodiments will be readily apparent to those skilled in the art.

The present inventor has recognised that generic bonding policies developed to inform how and when to use bonded links in converged networks are not always suitable for all forms of traffic. In particular, the bursty traffic flows used to deliver content such as video, audio, gaming and VR data have distinct requirements compared to non-bursty traffic flow types. It is therefore proposed to classify data flows as being either bursty or not bursty. In this way a specific bursty bonding policy can be applied to bursty data flows. Further, since the requirements of bursty data flows change over time, it is also proposed to monitor bursty flows as they progress to identify their current flow state. The bursty bonding policy is then applied to the current flow state so that a data packet, or group of data packets, to be delivered is/are transmitted over an appropriate one of the communication networks forming the converged network.

In this way, bonded links can be made use of so that requirements of bursty flows (for example "fast start", i.e. loading of the content buffer within a timeframe short enough to be acceptable to a user) can be met without putting undue burden on links with scarce or costly resources or unduly inhibiting concurrent data flows. In other words, identification of a data flow as bursty, together with categorisation of a current flow state, enables appropriate real-time application of a specific bursty bonding policy to improve the balance between bursty flow delivery performance and efficiency of resource use in a converged network.

Figure 1:
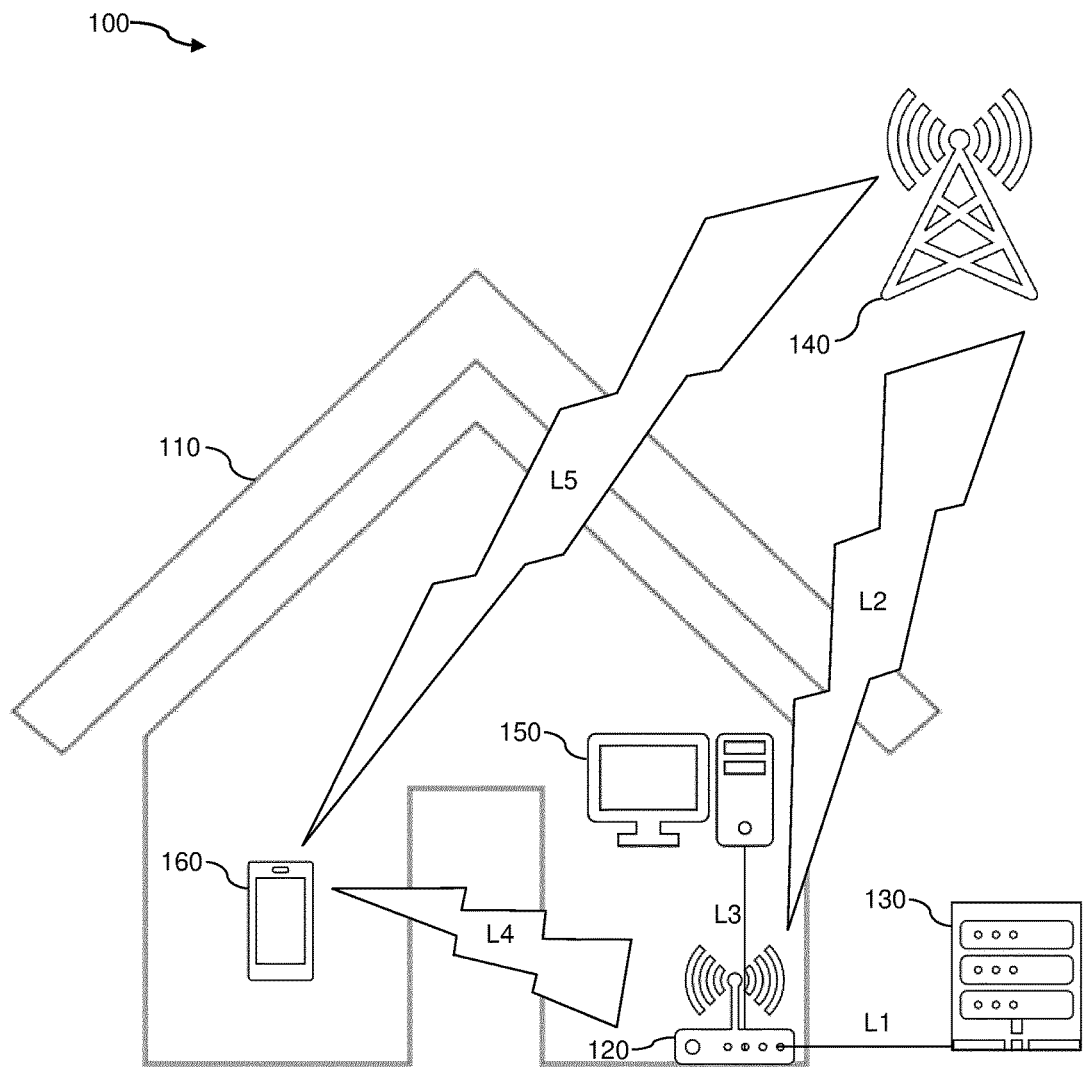
FIG. 1 is a schematic illustration of converged network access provision to devices within a premises.
Figure 2A:
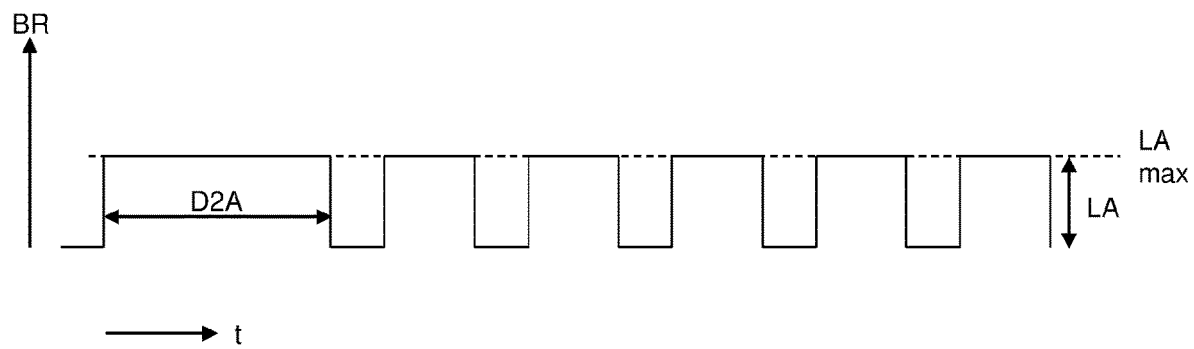
FIG. 2A illustrates example bursty flow delivery over a traditional communication link.
Figure 2B:
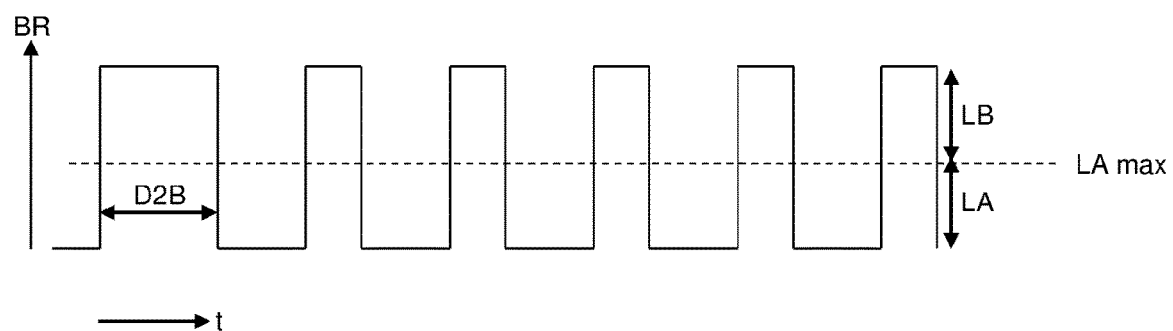
FIG. 2B illustrates example bursty flow delivery over a bonded communication link.
Figure 8A:
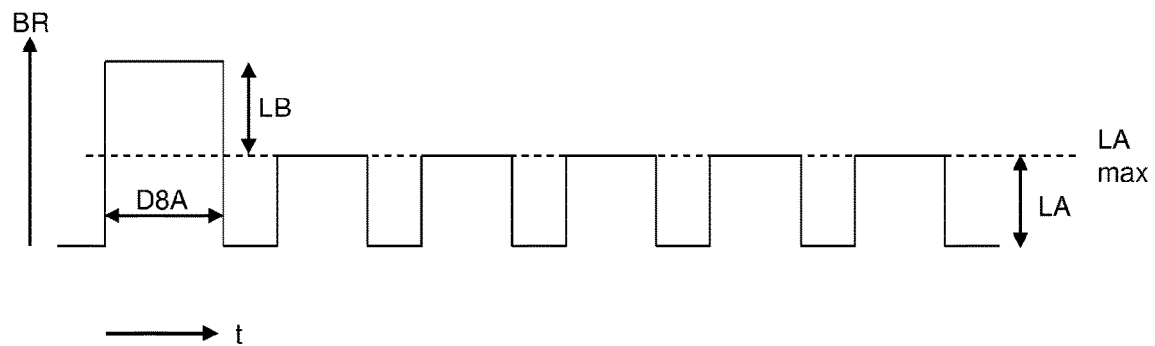
FIG. 8A illustrates example bursty flow delivery over a bonded communication link according to methods of the present disclosure.

As illustrated in FIG. 2B, a typical video client will drive a multipath connection into overflow on each data request, even if the average data rate is below the capacity of the primary connection. This causes unnecessary use of the secondary connection. In contrast, according to the present disclosure it is possible to manage use of different connections such that best use is made of the available resources considering the requirements of each data flow. In particular, for video or other bursty traffic download, overflow can be allowed for initial start-up to ensure fast start of the content, but the flow can subsequently be restricted to only the primary connection if that has sufficient average bandwidth available. This is illustrated in FIG. 8A (to be described in further detail below), where D8A (the initial burst duration) is similar to D2B as shown in FIG. 2B but the secondary link LB is not used beyond that initial burst.

Figure 3:
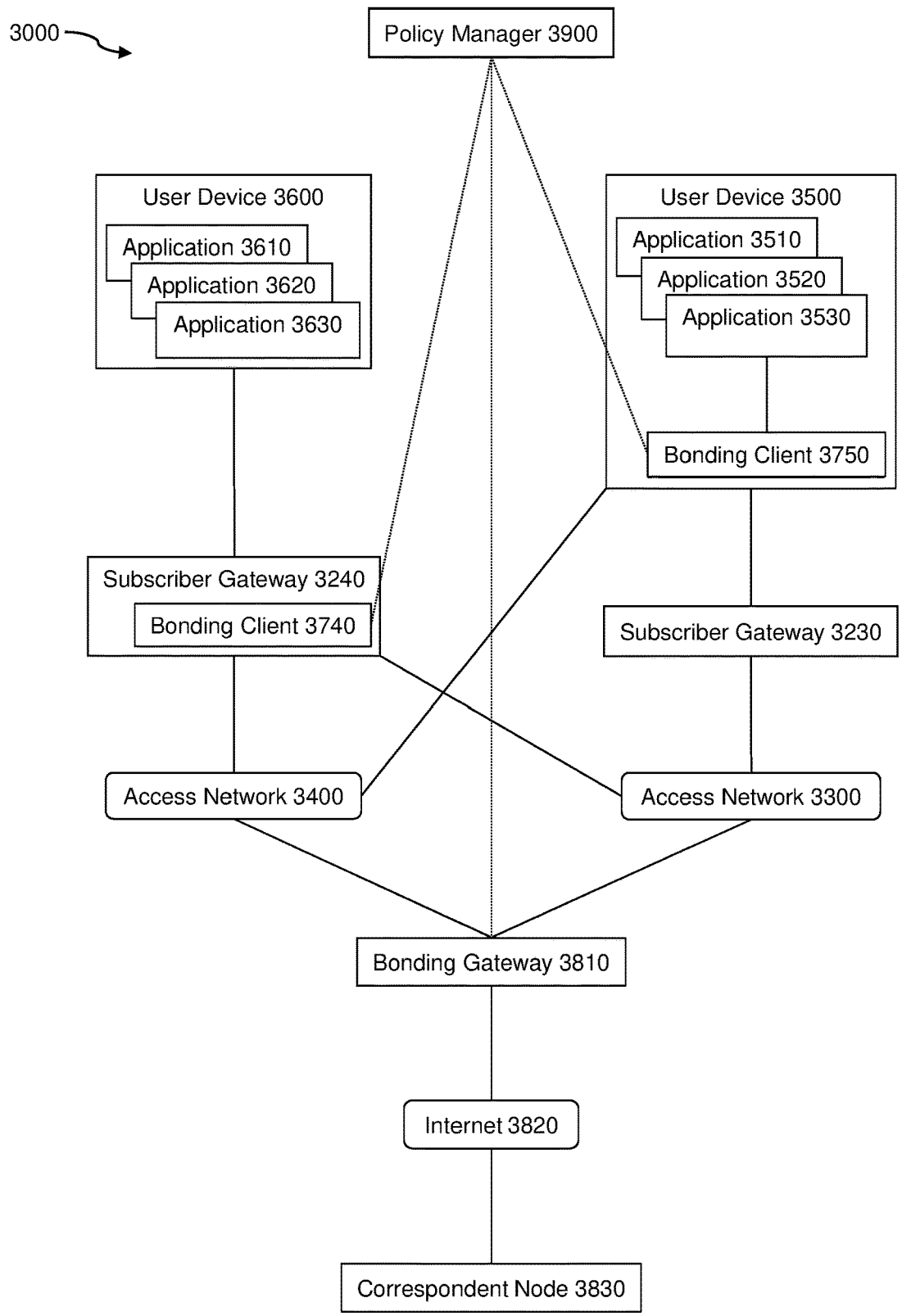
FIG. 3 schematically illustrates an example system in which methods of the present disclosure can be implemented.

FIG. 3 schematically illustrates an example system 3000 in which the method described above can be implemented. A correspondent node 3830, for example the server of a video streaming service, has a bursty data flow to transmit to two user devices 3600 and 3500 respectively running applications 3610, 3620, 3630 and 3510, 3520, 3530, for example video streaming apps, web browsers or gaming applications. The correspondent node 3830 is connected to the Internet 3820, which is in turn connected to a bonding gateway 3810 which is intermediate the Internet 3820 and two access networks 3400 and 3300. The user devices 3600 and 3500 are each provided with access to both of the access networks 3400 and 3300. The user device 3600 is provided with access to both of the access networks 3400 and 3300 through a subscriber gateway 3240. The user device 3500 is provided with access to the access network 3300 through a subscriber gateway 3230, whereas its access to the access network 3400 is through a direct link. A bonding client 3740 runs on the subscriber gateway 3240 and another bonding client 3750 runs on the user device 3500. Both of the bonding clients 3740 and 3750, as well as the bonding gateway 3810, control the bursty data flow according to a bursty bonding policy set by a policy manager 3900.

The bonding clients 3740, 3750 and the bonding gateway 3810 can be pre-loaded with bursty and generic bonding policies or can request them from the policy manager 3900. Bonding policies can for example comprise a list of traffic flow templates and an overall bonding limits policy. Each of the traffic flow templates can correspond to a traffic distribution policy. The overall bonding limits policy can for example comprise limits on maximum total throughput: overall and per access type; uplink, downlink and total.

The traffic flow template can for example include one or more of the following fields:
  i. destination address, such as destination Internet Protocol (IP) address;
  ii. destination domain, which could for example be captured by the bonding client 3740 or 3750 via interception of Data Source Name (DSN) requests;
  iii. Differentiated Services Code Point (DSCP) marking on the request or traffic;
  iv. whether the bonding client is in the end user device (as is the case for the bonding client 3750) or not (as is the case for the bonding client 3740); and
  v. (if the bonding client 3750 is in the end user device 3500) source application, an identifier of the application 3510, 3520, 3530 that generated the connection request (e.g. a video app or browser); or
  i. (if the bonding client 3740 is in the subscriber gateway 3240) source device identifier such as Media Access Control (MAC) address and/or source device type (e.g. set top box, smartphone, security camera).

Figure 4:
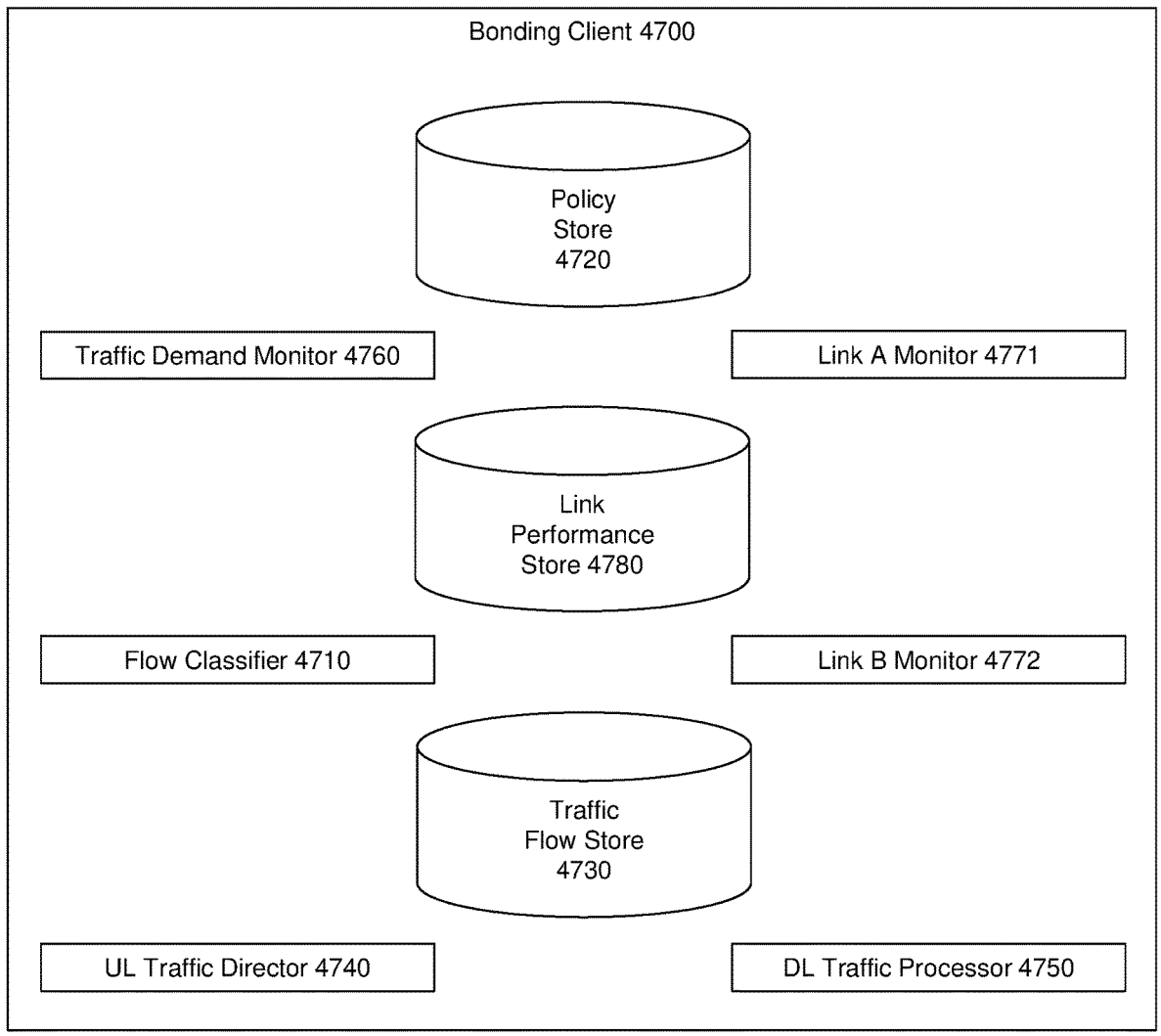
FIG. 4 schematically illustrates an example bonding client.

When one of the applications 3610, 3620, 3630 or 3510, 3520, 3530 on the user device 3600 or 3500 initiates a traffic flow the corresponding bonding client 3740 or 3750 has to determine how to handle that traffic flow. FIG. 4 schematically illustrates an example bonding client 4700, which could for example correspond to either of bonding clients 3740 or 3750 of FIG. 3.

Firstly, a flow classifier 4710 of the bonding client 4700 classifies the flow based on a bonding policy stored in a policy store 4720. The flow classification is stored in a traffic flow store 4730. Optionally the new flow classifier can also send the flow classification to a flow classifier in the bonding gateway, an example of which will be described in more detail below in relation to FIG. 5.

An uplink (UL) traffic director 4740 selects which access network interface to send each packet from the flow to, based on the traffic distribution policy for the flow and the overall bonding limits policy. In the example of FIG. 3, the subscriber gateway 3240 has interfaces corresponding to each of the access networks 3400 and 3300 so that traffic from the user device 3600 is directed via the appropriate interface of the subscriber gateway 3240 according to instructions from the bonding client 3740. The subscriber gateway 3230 on the other hand only has an interface corresponding to the access network 3300; it is the user device 3500 that has two interfaces (one corresponding to the access network 3400 and the other to the subscriber gateway 3230). Traffic from the user device 3500 is directed via its appropriate interface according to instructions from the bonding client 3750.

Figure 5:
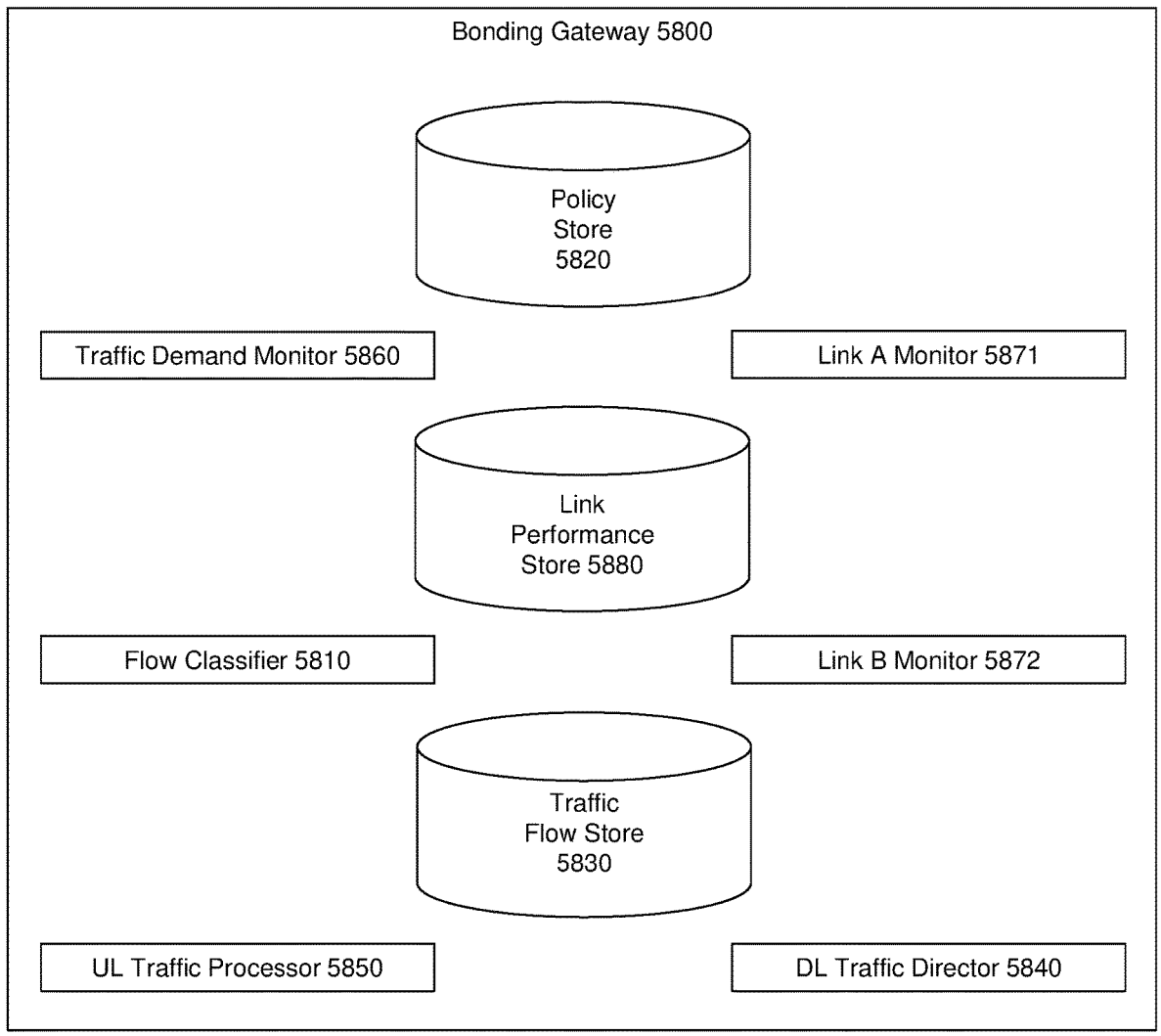
FIG. 5 schematically illustrates an example bonding gateway.

After traversing the selected access network 3400 or 3300, the first packet(s) of the flow reach the bonding gateway 3810. FIG. 5 schematically illustrates an example bonding gateway 5800, which could for example correspond to the bonding gateway 3810 of FIG. 3. A flow classifier

5810 classifies the flow based on a bonding policy stored in a policy store 5820 in a similar manner to the bonding client 4700's flow classifier 4710 (with optional input from it as mentioned above). The flow classification is stored in a traffic flow store 5830. An uplink traffic processor 5850 performs any necessary buffering and packet reordering. The bonding gateway 5800 then forwards the traffic to the correspondent node (e.g. 3830 in FIG. 3). The correspondent node then replies with downlink traffic destined for the application that initiated the traffic flow. A traffic demand monitor 5860 can also monitor the bit rate of uplink and/or downlink traffic traversing the bonding gateway 5800. This can optionally feed into the flow classifier 5810.

When the downlink traffic arrives at the bonding gateway 5800 a downlink (DL) traffic director 5840 selects which interface to send each packet from the flow to, based on the traffic steering policy for the flow and the overall bonding limits policy. (In the example of FIG. 3, the bonding gateway 3810 has interfaces corresponding to each of the access networks 3400 and 3300.)

After traversing the selected access network 3400 or 3300, and any intermediate nodes on the link being used (e.g. one of the subscriber gateways 3240, 3230), the first packet(s) of the downlink flow reach the bonding client 3740 or 3750 that requested it. (Alternatively, if the traffic is part of a new server-side initiated flow, the flow is classified as described above.) Returning to FIG. 4, a downlink traffic processor 4750 of the bonding client 4700 performs any necessary buffering and packet reordering. Finally, the bonding client 4700 forwards the traffic to the destination user device (e.g. the user device 3600 of FIG. 3) or application (e.g. one of the applications 3510, 3520, or 3530 of the user device 3500 of FIG. 3).

The bonding client 4700 can also comprise monitors 4760 for traffic demand, 4771 for a first link A (which can e.g. be over the access network 3400 in the system of FIG. 3) and 4772 for a second link B (which can e.g. be over the access network 3300 in the system of FIG. 3). A link performance store 4780 can store the data collected by the link monitors 4771 and 4772. The selection of which link to use by the uplink traffic director 4740 can be based at least in part on data from the traffic demand monitor 4760 and/or the link performance store 4780. The bonding gateway 5800 can comprise corresponding monitors 5860 for traffic demand, 5871 for link A and 5872 for link B, as well as a corresponding link performance store 5880. The selection of which link to use by the downlink traffic director 5840 can similarly be based at least in part on data from the traffic demand monitor 5860 and/or the link performance store 5880.

Figure 6:
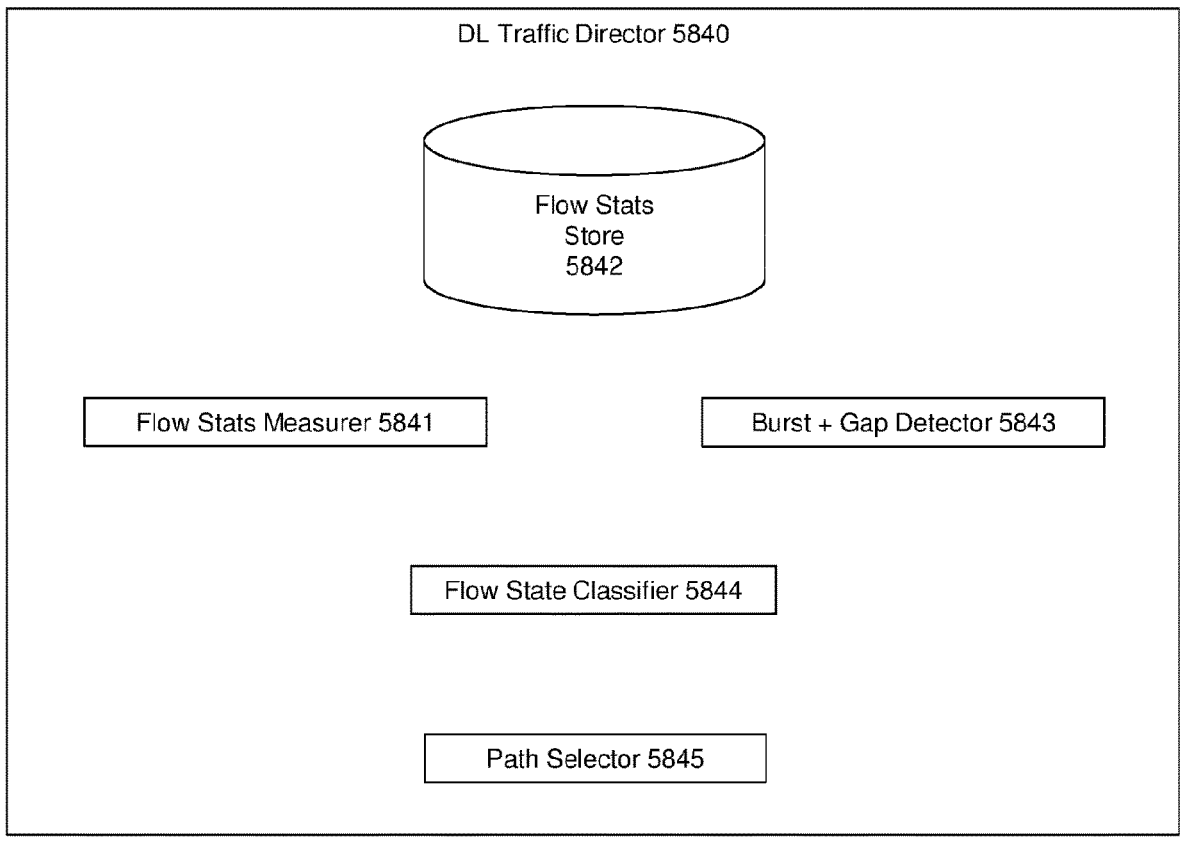
FIG. 6 schematically illustrates an example downlink traffic director.

FIG. 6 schematically illustrates the downlink traffic director 5840 of FIG. 5. A flow stats measurer 5841 tracks the statistics of the traffic for individual flows and the aggregate of flows for individual users and/or devices. This enables throughput limits for those individuals to be applied. The statistics can also be used for flow classification and packet steering. Base measurements can for example be updated every 100 ms. Statistics determined can for example comprise any of the following:

i. flow duration: the time since the flow started;
  ii. average flow rate: the latest running average of flow bit rate (total and/or per link),
  iii. (for bursty flows) cycle time: the average time between the start of consecutive transmission bursts;
  iv. (for bursty flows) transmit fraction: the latest running average of time spent in traffic burst as a fraction of time spent in burst and time not in burst (the averaging period can for example be set to an integer multiple of the cycle time).

The flow stats measurer 5841 notes the start time of the flow and stores it in a flow stats store 5842. It also measures the uplink and downlink throughput periodically (e.g. every 100 ms) on each interface and records the measurements (and the total across the interfaces) in the flow stats store 5842.

For traffic flows that have been classified as bursty, a burst+gap detector 5843 reads the values from the flow stats store 5842 and identifies whether there is a burst+gap pattern and if so, what the transmit fraction and the cycle time are. It then writes this data back into the flow stats store 5842.

A bursty flow state classifier 5844 uses the information in the flow stats store to determine whether the flow is in one of the following phases:

i. start-up,
  ii. established,
  iii. catchup and
  iv. overload.

Figure 7:
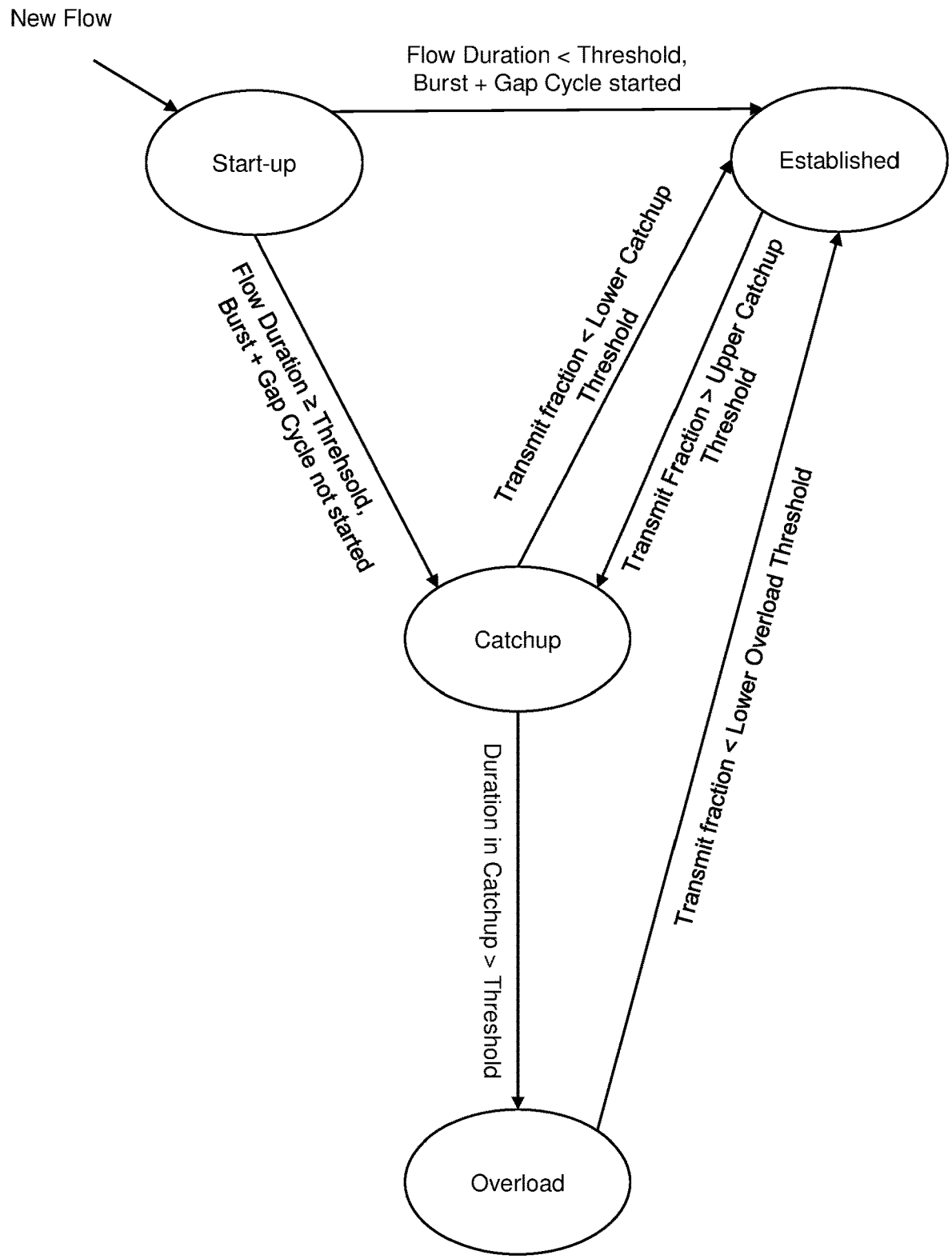
FIG. 7 is an example flow state classifier state transition diagram.

An explanatory flow state classifier state transition diagram is shown in FIG. 7. The flow is classified as being in start-up phase if the flow duration is below a predetermined threshold start-up flow duration (e.g. 6 seconds) and the flow has not started a burst+gap cycle. If the flow duration exceeds the threshold start-up flow duration without starting a burst+gap cycle, the flow is reclassified as being in catchup phase. Alternatively, if the flow starts a burst+gap cycle before the threshold start-up flow duration is reached then the flow is re-classified as being in established phase. An established flow is reclassified as being in catchup phase if the transmit fraction reaches a predetermined upper catchup threshold transmit fraction (e.g. 1.0). Conversely, a catchup phase flow is reclassified as established if the transmit fraction drops below a predetermined lower catchup threshold transmit fraction (e.g. 0.8). A catchup phase flow is reclassified as being in overload phase if it remains in the catchup phase for longer than a predetermined threshold catchup duration. An overload phase flow is reclassified as being in established phase if the transmit fraction drops below a lower overload threshold, which may be the same as the lower catchup threshold transmit fraction or different.

Returning to FIG. 6, the flow state classifier 5844 can also determine the underlying bit rate for the flow and note in the flow stats store 5842 any points in time where the underlying video bit rate changes (e.g. if the requesting application has requested a higher or lower quality stream). Adaptive bit rate systems may vary over time the bit rate between a number of set levels (and corresponding content qualities) depending on the capacity of the link between client and server. The flow state classifier 5844 can track these changes. It can also monitor for oscillations in the underlying video bit rate and flag the flow as unstable if the flow oscillates between higher and lower bit rates more frequently than a predetermined threshold (e.g. 2 minutes).

Turning to the operation of the path selector 5845, its function is to decide which link each packet should be sent over. It takes as input the traffic steering policy, the information in the flow stats store 5842 and aggregate information across all flows about traffic to and from the user device over each link. This can include information, including aggregate statistics, provided to it by the bonding client.

For example, a particular subscriber could be streaming video to a user device (e.g. one of the user devices 3600 or 3500 of FIG. 3) in their home via a hybrid access residential gateway (such as one of the subscriber gateways 3240 or 3230 of FIG. 3). They may have paid for a particular level of service which gives them an 8 Mbps DSL service with a top-up 4G cellular capability that can run at up to 10 Mbps. However, the service is not designed to support sustained streaming of ultra-high-definition (UHD) video (as this would adversely impact other users of the 4G service). The generic bonding policy could indicate priority based: DSL first. Once the flow is classified as being bursty, the path selector 5845 operates special bursty flow specific functionality, taking real-time input from the flow state classifier 5844.

In this example, in order to fill the target application's video buffers as fast as possible, when the flow is classified by the flow state classifier 5844 as being in start-up or catchup phase, the path selector 5845 uses both links immediately to achieve maximum throughput (subject to any required policy and link capacity/loading checks). The full 8 Mbps capacity of the DSL link and the full 10 Mbps allocation of the 4G link is used (less any used by other applications provided with network access by the same hybrid access residential gateway). The video buffer will be filled at up to 18 Mbps, allowing the viewer to start viewing without a long buffering delay.

If or when the flow is reclassified by the flow state classifier 5844 as being in established phase, the path selector 5845 sends the traffic over the primary DSL link only (subject to any required policy and link capacity/loading checks). In this example, the client could settle on requesting a video stream encoded at 6 Mbps. The path selector 5845 notices that this stream is in established phase with a transmit fraction of 75% (8 Mbps for 75% of the time, and nothing for the remainder).

If, in the middle of video delivery, some other user, device or application starts consuming some of the DSL capacity the DSL link may not be capable of sustaining the video stream and this new traffic. As a result, the video flow transmit fraction rises to 100% and the flow is reclassified by the flow state classifier 5844 as being in catchup phase. The path selector 5845 can then start aggregating the flow over both the primary and secondary links.

If the congestion persists and the flow remains in catchup phase for more than the threshold catchup duration, it is reclassified by the flow state classifier 5844 as being in overload phase. At this stage, the path selector 5845 can revert to using the generic bonding policy. The end user will probably experience buffering at this point, after which the application playing the video may reduce the video quality to lower the required bandwidth.

When the transmit fraction drops below the lower overload threshold the flow is reclassified by the flow state classifier 5844 as being in established phase. The lower overload threshold transmit fraction could be a fixed percentage or could be set to select the point where all the flow traffic could be carried on the primary link. To achieve this, the running average flow rate over the primary connection can be measured during an interval when overflow is occurring, or during an interval when the flow is in overload phase. This gives the effective capacity of the primary link that is available to the flow.

Alternatively or additionally, the path selector 5845 can monitor the total amount of catchup and overload time and volumes of data consumed during these times for a particular user/device, and/or the total usage of the primary and secondary access links and restrict the use of the secondary link if one or more of these values cross one or more of a set of thresholds.

Figure 8B:
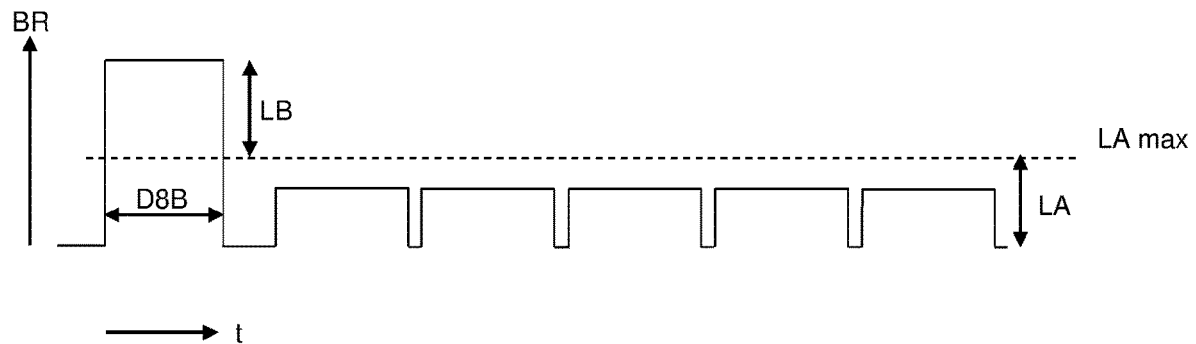
FIG. 8B illustrates example bursty flow delivery over a bonded communication link with shaping according to methods of the present disclosure.
Figure 8C:
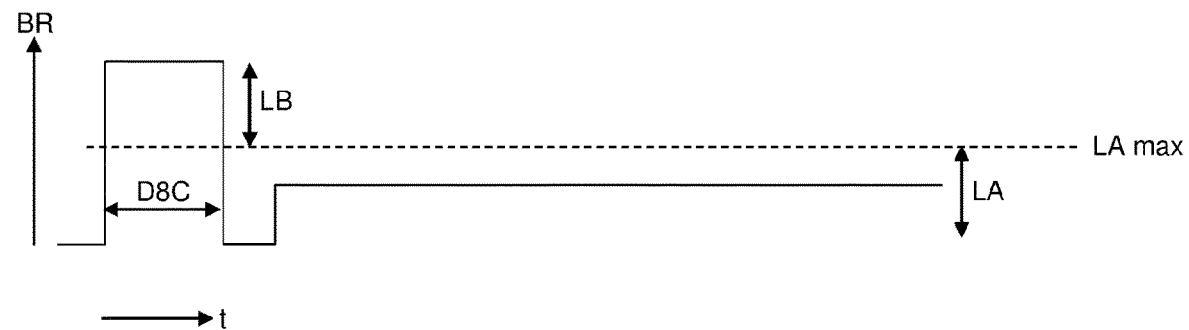
FIG. 8C illustrates example bursty flow delivery over a bonded communication link with ideal shaping according to methods of the present disclosure.

Optionally, the path selector 5845 can apply throttling (the intentional limiting of the rate at which traffic is passed) and/or traffic shaping to the flow. In the above example, it could shape the traffic so that it is sent downstream at just over 6 Mbps for 90% of the time. (This reduces the impact of bursty traffic on the downstream networks. Ideally the transmit fraction would be kept as close to 100% as possible without creating buffering or requiring overflow onto the secondary link.) FIGS. 8A to 8C illustrate this behaviour. FIG. 8A corresponds to FIG. 2B, only the bursty ponding policy is applied to allow use of link B for fast start, but not thereafter. In FIG. 8B some shaping is applied following the initial burst to ensure link A's capacity is not entirely consumed during bursts, freeing up capacity for other traffic. FIG. 8C illustrates ideal shaping, where, beyond the initial burst, link A is used continuously but at the lowest possible bit rate to avoid buffering. The initial burst duration D8A, D8B, D8C is the same as D2B of FIG. 2B in all of FIGS. 8A to 8C. In the comparison of transmit fraction with relevant thresholds, if traffic shaping is being applied then the effects of the shaping are compensated for before comparison with the thresholds.

Figure 9:
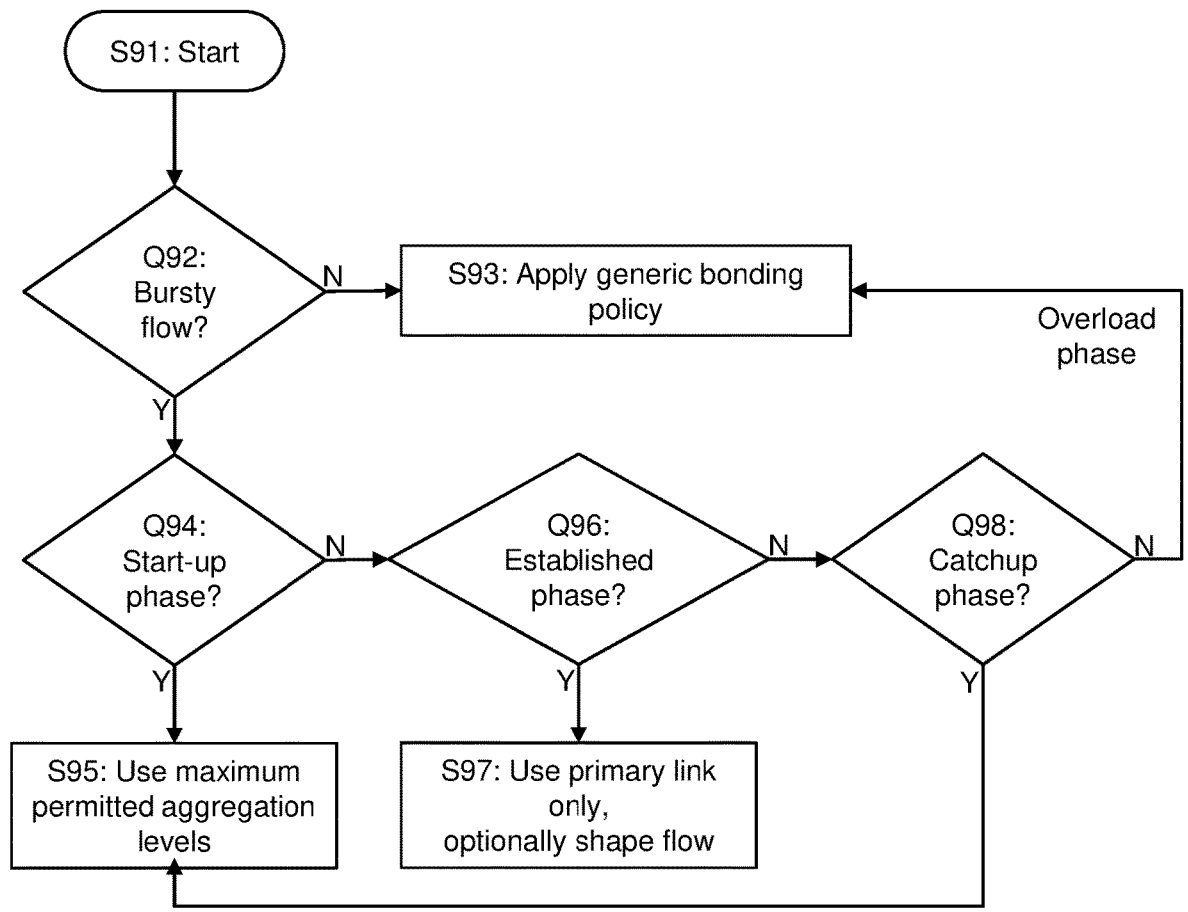
FIG. 9 is a flowchart illustrating implementation of an example bursty bonding policy.

FIG. 9 is a flowchart illustrating the bursty bonding policy of the example above. The policy starts at step S91, then moves to query Q92 where it is determined whether the flow is bursty. If not, then the generic bonding policy is applied at step S93. If the flow is bursty however, then the policy proceeds to query Q94 where it is determined whether the flow is in start-up phase. If so, then maximum permitted aggregation levels are used at step S95. If not, the policy proceeds to query Q96 where it is determined whether the flow is in established phase. If so, then the primary link only is used at step S97, optionally with shaping. If not, the policy proceeds to query Q98 where it is determined whether the flow is in catchup phase. If so, then maximum permitted aggregation levels are used at step S95. If not, the flow must be in overload phase, so the generic bonding policy is applied at step S93.

Traffic prioritisation (e.g. DSCP based prioritisation) can be applied at various points in the network (including independently on each access link).

Although the above example refers to a bonded link consisting of two links, similar techniques could be used in systems bonding more than two links.

The above example tracks the burst+gap cycle to determine the flow state but this is not essential; for example, flow duration alone could be considered.

An alternative policy could involve tracking the peak and average usage for each flow. Overflow could be permitted until the flow has exceeded the capacity of the primary link and then dropped to a threshold below that level (in order to permit the initial traffic burst), then after that point overflow would only be permitted if the running average flow rate exceeds a threshold slightly below the capacity of the primary link. The periodicity of any variations in throughput could be measured and used to adjust the averaging period.

Figure 10:
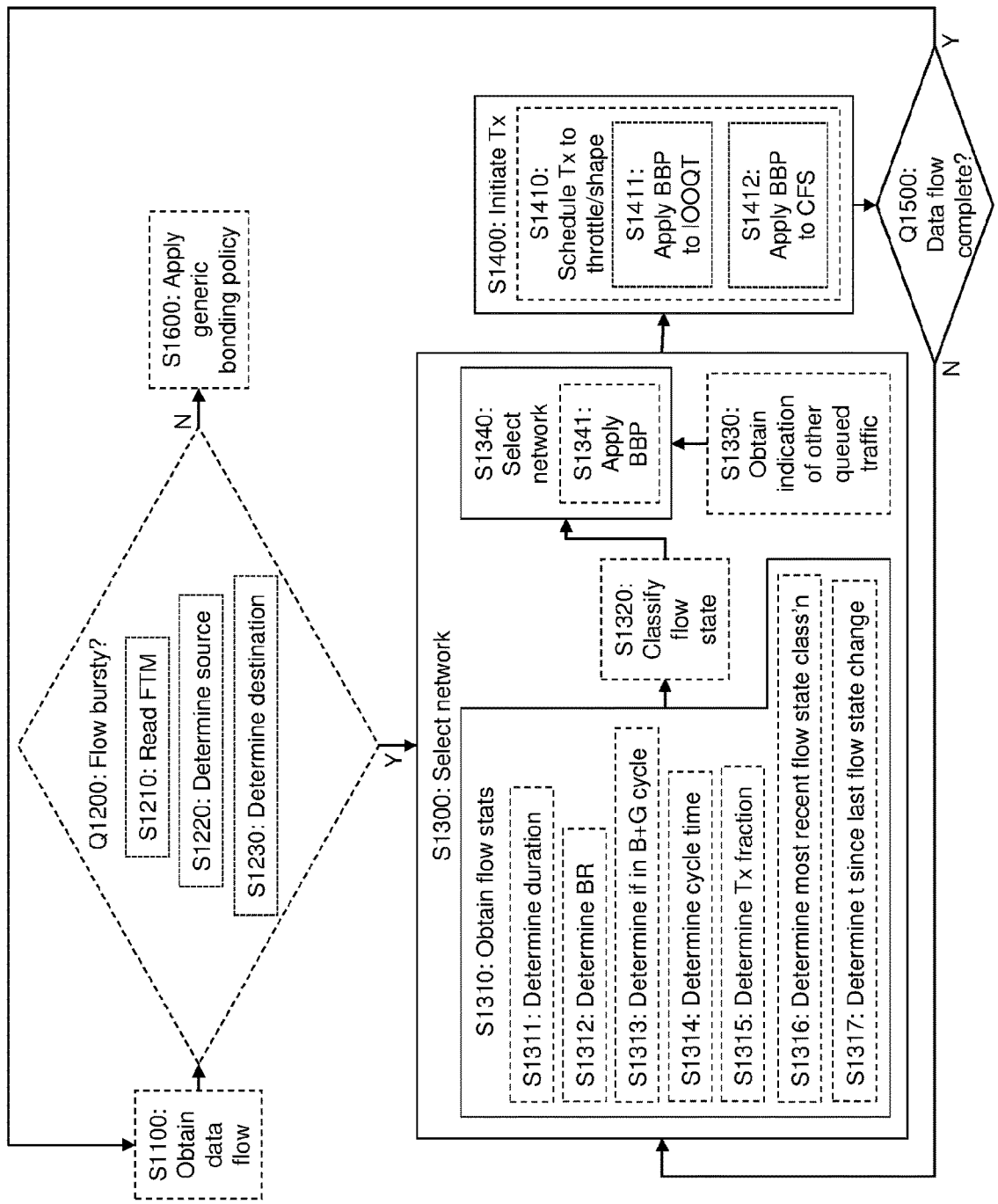
FIG. 10 is a flowchart generically illustrating methods of the present disclosure.

FIG. 10 is a flowchart generically illustrating the techniques described above. It shows a computer-implemented method for routing a bursty data flow comprising a series of one or more data packets over a converged network comprising a plurality of communication networks. The data flow could be generated by the computer performing the method or received by it from another computer. The method comprises, for each of the series of data packets in turn, selecting which one of the plurality of communication networks to transmit that data packet over at step S1300. This is achieved by obtaining flow statistics indicating a current flow state of the bursty data flow at step S1310, then selecting the one of the plurality of communication networks in dependence on said flow statistics at step S1340. Following step S1300, transmission of the data packet over the selected one of the plurality of communication networks is initiated at step S1400. At query Q1500 it is then determined whether the data flow is complete. If so, then the method goes dormant until another data flow is obtained at optional step S1100. If not, then the flow cycles back to step S1300 for the next of the series of data packets.

The method can further comprise, between steps S1310 and S1340, performing a classification of the current flow state of the bursty data flow by selecting from a list of flow states in dependence on the flow statistics at optional step S1320. Step S1340 can then comprise selecting the one of the plurality of communication networks in accordance with a bursty bonding policy (BBP) which mandates selection of the one of the plurality of communication networks in dependence on said classification at optional step S1341.

As described in relation to the example discussed above, at optional step S1320 the current flow state can be selected from a list comprising a start-up phase and an established phase. The bursty bonding policy can be configured to result in transmission of the bursty data flow over a first set of two or more of the plurality of networks while the current flow state is classified as start-up phase. The bursty bonding policy can be configured to result in transmission of the bursty data flow over a second set of the plurality of networks while the current flow state is classified as established phase, wherein the second set is smaller than the first set.

The flow statistics can for example comprise a current flow duration and an indication of whether or not a burst+gap cycle has started. In that case, optional step S1320 can comprise classifying the bursty data flow as being in the start-up phase when it is determined that the current flow duration is below a threshold start-up flow duration and that the burst+gap cycle has not yet started. (The threshold start-up flow duration could for example be between 1 and 10 seconds, e.g. 6 seconds.) Optional step S1320 can comprise classifying the bursty data flow as being in the established phase when it is determined that the current flow duration is below the threshold start-up flow duration and the burst+gap cycle has started.

The flow statistics can for example further comprise a current transmit fraction, a most recent classification and a time since the classification last changed. The list of flow states can further comprise a catchup phase and an overload phase. Optional step S1320 can in that case comprise classifying the bursty data flow as being in the catchup phase when it is determined that the current flow duration is equal to or greater than the threshold start-up flow duration and that the burst+gap cycle has not yet started. Optional step S1320 can comprise classifying the bursty data flow as being in the catchup phase when it is determined that a most recent classification of the flow state is established phase and that a transmit fraction of the bursty data flow in the established phase has risen above an upper catchup threshold transmit fraction (e.g. 1.0). Optional step S1320 can comprise classifying the bursty data flow as being in the overload phase when it is determined that a most recent classification of the flow state is catchup phase and that a time spent in the catchup phase has risen above a threshold catchup duration. (The threshold catchup duration could for example be between 30 seconds and 3 minutes, e.g. 90 seconds.) Optional step S1320 can comprise classifying the bursty data flow as being in the established phase when it is determined that a most recent classification of the flow state is catchup phase and that a transmit fraction of the bursty data flow in said catchup phase has fallen below a lower catchup threshold transmit fraction (e.g. 0.8). Optional step S1320 can comprise classifying the bursty data flow as being in the established phase when it is determined that a most recent classification of the flow state is overload phase and that a transmit fraction of the bursty data flow in said overload phase has fallen below a lower overload threshold transmit fraction (e.g. 0.8).

The bursty bonding policy can be configured to result in transmission of the bursty data flow over a third set of the plurality of networks while the current flow state is classified as catchup phase, and according to a generic bonding policy while the current flow state is classified as overload phase. The third set of the plurality of networks can be the same as either the first or second set, or different.

The bursty bonding policy can be configured to result in transmission of the data flow over a plurality of the plurality of networks for no more than a threshold bonding interval (for example between 1 and 15 minutes, e.g. 5 minutes).

The method can further comprise performing an optional precursor query Q1200 to classify the data flow as bursty. This can follow from optional step S1100 and can comprise one or more of:

i. obtaining a flow type marker (such as a DSCP marker) comprised in one or more of the data packets and classifying the data flow as bursty in dependence thereon at optional step S1210;

ii. obtaining an indication of a source from which the data flow originated (such as a source application, source device type (e.g. set top box, smartphone, security camera), source device identifier (e.g. MAC or IP address, or source domain) and classifying the data flow as bursty in dependence thereon at optional step S1220; and iii. obtaining an indication of a destination to which the data flow is addressed (such as a destination application, destination device type, destination device identifier e.g. MAC or IP address, or destination domain) and classifying the data flow as bursty in dependence thereon at optional step S1230.

If the flow is classified as not bursty by query Q1200 then a generic bonding policy can be applied at optional step S1600.

Step S1300 can further comprise, for each of the series of data packets in turn, obtaining an indication of other traffic queued to traverse a node of the converged network that data packet will traverse during its transmission at optional step S1330. Step S1340 can comprise selecting the one of the plurality of communication networks further in dependence on that indication.

For each of the series of packets, the initiating step S1400 can comprise scheduling transmission of that data packet so as to throttle and/or shape the bursty data flow at optional step S1410.

If optional steps S1341 and S1410 are both implemented, then step S1410 can be performed by applying the bursty bonding policy (BBP) to the indication of other traffic queued to traverse the node of the converged network the data packet will traverse during its transmission (IOOQT) at optional step S1411.

The optional scheduling step S1410 can be performed by applying the bursty bonding policy (BBP) to the classification of the current flow state (CFS) at optional step S1412.

The step S1310 of obtaining the flow statistics can optionally comprise one or more of:

i. determining a current duration of the bursty data flow at optional step S1311;
ii. determining a bit rate of the bursty data flow at optional step S1312;
iii. determining whether a burst+gap (B+G) cycle of the bursty data flow has started at optional step S1313;
iv. determining a cycle time of the bursty data flow as an average time between the start of consecutive transmission bursts at optional step S1314;
v. determining a current transmit fraction of the bursty data flow, defined as a running average of time spent in traffic burst as a fraction of current duration of the bursty data flow at optional step S1315 (e.g. with an averaging period set to an integer multiple of the cycle time);
vi. determining a most recent classification of the flow state at optional step S1316 and
vii. determining a time since the flow state classification was last changed at optional step S1317.

The bursty bonding policy can be configured to result in transmission of the data flow in one of the following modes:
i. overflow mode, wherein a preferred connection over one of the communication networks is preferentially used, connections over the other communication networks of the plurality only being used if demand exceeds the capacity of the preferred connection;
ii. failover mode (also known as backup mode), wherein a mandated connection over one of the communication networks is exclusively used, connections over the other communication networks of the plurality only being used if the mandated connection fails;
iii. load balance mode, wherein one of the communication networks is used for a predetermined fraction of traffic;
iv. minimise latency mode, wherein traffic is distributed amongst connections over the plurality of communication networks in such a way as to minimise an objective function representing latency;
v. maximise peak rate mode, wherein traffic is distributed amongst connections over the plurality of communication networks in such a way as to maximise an objective function representing peak data rate:
  a. per communication network on an uplink of the respective communication network;
  b. per communication network on a downlink of the respective communication network;
  c. per communication network in aggregate on an uplink and a downlink of the respective communication network;
  d. in aggregate over the converged network on its uplink;
  e. in aggregate over the converged network on its downlink; or
  f. in aggregate over the converged network in aggregate on its uplink and its downlink;
vi. maximise average rate mode, wherein traffic is distributed amongst connections over the plurality of communication networks in such a way as to optimise an objective function representing maximum average data rate:
  a. per communication network on an uplink of the respective communication network;
  b. per communication network on a downlink of the respective communication network;
  c. per communication network in aggregate on an uplink and a downlink of the respective communication network;
  d. in aggregate over the converged network on its uplink;
  e. in aggregate over the converged network on its downlink; or
  f. in aggregate over the converged network in aggregate on its uplink and its downlink; and
vii. fast start mode, wherein an initial portion of the data flow is transmitted in overflow mode and a subsequent portion of the data flow in failover mode.

The bursty bonding policy can be configured to result in transmission of the data flow within one or more throughput limits comprising limits on throughput:
i. per communication network on an uplink of the respective communication network;
ii. per communication network on a downlink of the respective communication network;
iii. per communication network in aggregate on an uplink and a downlink of the respective communication network;
iv. in aggregate over the converged network on its uplink;
v. in aggregate over the converged network on its downlink; and
vi. in aggregate over the converged network in aggregate on its uplink and its downlink.

The bursty data flow can comprise only the one or more data packets referred to above. Alternatively, the bursty data flow can comprise one or more blocks of consecutive data packets, each block comprising only one of the series of data packets referred to above and one or more further data packets. In the latter case, the method can further comprise, for each of the blocks, initiating transmission of the one or more further data packets over the same one of the plurality of networks as the respective one of the series of data packets. In other words, steps S1300 and S1400 could be performed either for each and every data packet in the data flow, or for only one data packet per block—e.g. for every $n^{th}$ data packet (where n is an integer, e.g. 5) in the data flow, so that each data packet in a given block of n consecutive data packets is transmitted over the same network. This can reduce the processing resources required without significantly sacrificing the suitability of the network selection in circumstances where the flow state of the data flow and/or other traffic demands on the converged network are unlikely to change within the time taken to transmit n data packets.

The plurality of communication networks can for example comprise two or more of: a cellular network; a fixed wire network, such as a network comprising electrical wires and/or optical fibres; and/or a Wi-Fi network.

Figure 11:
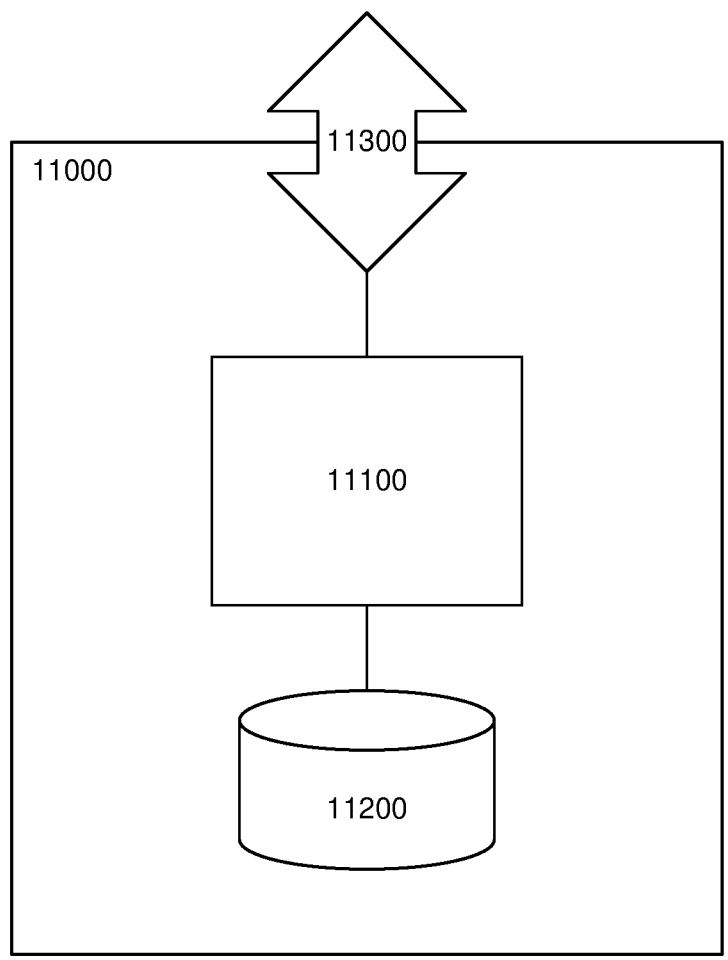
FIG. 11 schematically illustrates an example computing system.

The method of FIG. 10 can be implemented by a data processing system, for example in the form of a bonding gateway server, subscriber router device or user device. FIG. 11 schematically illustrates a suitable computing system 11000.

The computing system 11000 comprises a processor 11100 operably connected to each of a memory 11200 and a transceiver 11300. The memory 11200 can store a computer program comprising instructions which, when executed by the processor 11100 cause the computer system 11000 to perform the method of FIG. 10. Such a computer program can be stored on a computer-readable data carrier or carried by a data carrier signal, e.g. for download from a remote server over the Internet.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops and smartwatches.

Receivers and transmitters as described herein may be standalone or may be comprised in transceivers. A communication link as described herein comprises at least one transmitter capable of transmitting data to at least one receiver over one or more wired or wireless communication channels. Wired communication channels can be arranged for electrical or optical transmission. Such a communication link can optionally further comprise one or more relaying transceivers.

User input devices can include, without limitation, microphones, buttons, keypads, touchscreens, touchpads, trackballs, joysticks and mice. User output devices can include, without limitation, speakers, buzzers, display screens, projectors, indicator lights, haptic feedback devices and refreshable braille displays. User interface devices can comprise one or more user input devices, one or more user output devices, or both.

The invention claimed is:

1. A computer-implemented method for routing a bursty data flow comprising a series of one or more data packets over a converged network comprising a plurality of communication networks, the method comprising, for each of the series of data packets in turn:
   selecting which one of the plurality of communication networks to transmit that data packet over by:
   i) obtaining flow statistics indicating a current flow state of the bursty data flow;
   ii) performing a classification of the current flow state of the bursty data flow by selecting from a list of flow states in dependence on the flow statistics, the list of flow states comprising a start-up phase and an established phase; and
   iii) selecting the one of the plurality of communication networks in accordance with a bursty bonding policy which mandates selection of the one of the plurality of communication networks in dependence on said classification, wherein the bursty bonding policy is configured to result in transmission of the bursty data flow:
   over a first set of two or more of the plurality of networks while the current flow state is classified as start-up phase, and
   over a second set of the plurality of networks while the current flow state is classified as established phase, wherein the second set is smaller than the first set; then
   initiating transmission of the data packet over the one of the plurality of communication networks selected in step iii): wherein:
   the flow statistics comprise:
   a current flow duration, and
   an indication of whether or not a burst+gap cycle has started.

2. The method of claim 1, wherein:
   the step of performing the classification comprises:
   classifying the bursty data flow as being in the start-up phase by determining that the current flow duration is below a threshold start-up flow duration and that the burst+gap cycle has not yet started; or
   classifying the bursty data flow as being in the established phase by determining that the current flow duration is below the threshold start-up flow duration and that the burst+gap cycle has started.

3. The method of claim 2, wherein:
   the flow statistics further comprise:
   a current transmit fraction,
   a most recent classification, and
   a time since the classification last changed;
   the list of flow states further comprises a catchup phase and an overload phase; and the step of performing the classification alternatively comprises:
classifying the bursty data flow as being in the catchup phase by:
determining that the current flow duration is equal to or greater than the threshold start-up flow duration and that the burst+gap cycle has not yet started; or
determining that the most recent classification is established phase and that the current transmit fraction is higher than an upper catchup threshold transmit fraction; or
classifying the bursty data flow as being in the overload phase by determining that the most recent classification is catchup phase and that the time since the classification last changed is higher than a threshold catchup duration; or
classifying the bursty data flow as being in the established phase by:
determining that the most recent classification is catchup phase and that the transmit fraction is lower than a lower catchup threshold transmit fraction; or
determining that the most recent classification is overload phase and that the transmit fraction is lower than a lower overload threshold transmit fraction.

4. The method of claim 1, further comprising performing a precursor step in advance of all previously recited steps, said precursor step comprising one or more of:
obtaining a flow type marker comprised in one or more of the data packets and classifying the data flow as bursty in dependence thereon;
obtaining an indication of a source from which the data flow originated and classifying the data flow as bursty in dependence thereon; and
obtaining an indication of a destination to which the data flow is addressed and classifying the data flow as bursty in dependence thereon.

5. The method of claim 1,
further comprising, for each of the series of data packets in turn, obtaining an indication of other traffic queued to traverse a node of the converged network that data packet will traverse during its transmission;
wherein step (ii) comprises selecting the one of the plurality of communication networks further in dependence on that indication.

6. The method of claim 1, wherein, for each of the series of data packets, the initiating step comprises scheduling transmission of that data packet so as to throttle and/or shape the bursty data flow.

7. The method of claim 6,
further comprising, for each of the series of data packets in turn, obtaining an indication of other traffic queued to traverse a node of the converged network that data packet will traverse during its transmission;
wherein the scheduling step is performed by applying the bursty bonding policy to that indication.

8. The method of claim 6,
wherein the scheduling step is performed by applying the bursty bonding policy to the classification of the current flow state.

9. The method of claim 1, wherein the bursty data flow comprises one or more blocks of consecutive data packets, each block comprising:
only one of the series of data packets referred to in claim 1, and
one or more further data packets;
the method further comprising, for each of the blocks, initiating transmission of the one or more further data packets over the same one of the plurality of networks as the respective one of the series of data packets referred to in claim 1.

10. A data processing system configured to perform the method of claim 1.

11. A non-transitory computer-readable medium comprising computer readable instructions which, when the program is executed by a computer, cause the computer to carry out the method of claim 1.

12. A data processing system for routing a bursty data flow comprising a series of one or more data packets over a converged network comprising a plurality of communication networks, the data processing system comprising at least one processor and at least one non-transitory computer readable medium storing instructions such that upon being executed by the at least one processor, the data processing system is at least configured to, for each of the series of data packets in turn:
select which one of the plurality of communication networks to transmit that data packet over by:
i) obtaining flow statistics indicating a current flow state of the bursty data flow;
ii) performing a classification of the current flow state of the bursty data flow by selecting from a list of flow states in dependence on the flow statistics, the list of flow states comprising a start-up phase and an established phase; and
iii) selecting the one of the plurality of communication networks in accordance with a bursty bonding policy which mandates selection of the one of the plurality of communication networks in dependence on said classification, wherein the bursty bonding policy is configured to result in transmission of the bursty data flow:
over a first set of two or more of the plurality of networks while the current flow state is classified as start-up phase, and
over a second set of the plurality of networks while the current flow state is classified as established phase, wherein the second set is smaller than the first set; then
initiate transmission of the data packet over the one of the plurality of communication networks selected in step iii); and wherein:
the flow statistics comprise:
a current flow duration, and
an indication of whether or not a burst+gap cycle has started; and
the data processing system is further configured to:
classify the bursty data flow as being in the start-up phase by determining that the current flow duration is below a threshold start-up flow duration and that the burst+gap cycle has not yet started; or
classify the bursty data flow as being in the established phase by determining that the current flow duration is below the threshold start-up flow duration and that the burst+gap cycle has started.

13. The data processing system of claim 12, wherein:
the flow statistics further comprise:
a current transmit fraction,
a most recent classification, and
a time since the classification last changed;
the list of flow states further comprises a catchup phase and an overload phase; and the data processing system is further configured to alternatively:

classify the bursty data flow as being in the catchup phase by:

determining that the current flow duration is equal to or greater than the threshold start-up flow duration and that the burst+gap cycle has not yet started; or determining that the most recent classification is established phase and that the current transmit fraction is higher than an upper catchup threshold transmit fraction; or classify the bursty data flow as being in the overload phase by determining that the most recent classification is catchup phase and that the time since the classification last changed is higher than a threshold catchup duration; or classify the bursty data flow as being in the established phase by:

determining that the most recent classification is catchup phase and that the transmit fraction is lower than a lower catchup threshold transmit fraction; or determining that the most recent classification is overload phase and that the transmit fraction is lower than a lower overload threshold transmit fraction.

\* \* \* \* \*